United States Patent
Patankar et al.

(10) Patent No.: US 10,793,665 B2
(45) Date of Patent: Oct. 6, 2020

(54) POLYURETHANE FOAM FROM HIGH FUNCTIONALITY POLYISOCYANATE

(71) Applicant: DDP SPECIALTY ELECTRONIC MATERIALS US, INC., Collegeville, PA (US)

(72) Inventors: Kshitish A. Patankar, Midland, MI (US); Mark F. Sonnenschein, Midland, MI (US); Steven P. Crain, Midland, MI (US); Christina A. Rhoton, Midland, MI (US)

(73) Assignee: DDP SPECIALTY ELECTRONIC MATERIALS US, INC., Collegeville, PA (US)

(*) Notice: Subject to any disclaimer, the term of this patent is extended or adjusted under 35 U.S.C. 154(b) by 0 days.

(21) Appl. No.: 16/720,032

(22) Filed: Dec. 19, 2019

(65) Prior Publication Data

US 2020/0123305 A1 Apr. 23, 2020

Related U.S. Application Data

(62) Division of application No. 15/758,565, filed as application No. PCT/US2016/057636 on Oct. 19, 2016, now Pat. No. 10,577,454.

(60) Provisional application No. 62/248,061, filed on Oct. 29, 2015.

(51) Int. Cl.
| | |
|---|---|
| *C08G 18/76* | (2006.01) |
| *C08G 18/48* | (2006.01) |
| *C08G 18/42* | (2006.01) |
| *C08G 18/10* | (2006.01) |
| *C08G 101/00* | (2006.01) |

(52) U.S. Cl.
CPC ......... *C08G 18/7664* (2013.01); *C08G 18/10* (2013.01); *C08G 18/4219* (2013.01); *C08G 18/485* (2013.01); *C08G 18/4829* (2013.01); *C08G 2101/005* (2013.01); *C08G 2101/0025* (2013.01); *C08G 2105/02* (2013.01)

(58) Field of Classification Search
CPC .... C08G 18/10; C08G 18/42; C08G 18/4219; C08G 18/4829; C08G 18/485; C08G 18/7664
See application file for complete search history.

(56) References Cited

U.S. PATENT DOCUMENTS

| | | | | |
|---|---|---|---|---|
| 3,849,349 A | * | 11/1974 | Frisch et al. ......... | C08G 18/003 521/129 |
| 4,299,924 A | * | 11/1981 | Nomura ............... | C08G 18/092 521/131 |
| 4,791,148 A | | 12/1988 | Riley et al. | |
| 5,064,873 A | | 11/1991 | Snider et al. | |
| 5,164,422 A | | 11/1992 | Londrigan et al. | |
| 5,457,138 A | * | 10/1995 | Yuge ..................... | C08G 18/10 521/124 |
| 5,837,742 A | | 11/1998 | Fishback | |
| 5,962,541 A | | 10/1999 | Peterson et al. | |
| 7,619,014 B2 | | 11/2009 | Schilling et al. | |
| 2015/0051301 A1 | | 2/2015 | Schleiermacher et al. | |

FOREIGN PATENT DOCUMENTS

| | | |
|---|---|---|
| EP | 1894954 A1 | 3/2008 |
| JP | 3040728 B2 | 6/1991 |
| JP | H10212334 A | 8/1998 |
| JP | 2001316443 A | 11/2001 |
| JP | 2014520909 A | 8/2014 |
| WO | 2013002914 A1 | 1/2013 |

OTHER PUBLICATIONS

Kadkin, O, J. Polyester Polyols: Synthesis and Characterization of Diethylene Glycol Terephthalate Oligomers; Polym. Sci. A, 41, 1114-1123 (2003).

* cited by examiner

*Primary Examiner* — John M Cooney

(57) ABSTRACT

A formulation system contains: (a) a pre-polymer reaction product of a polymeric isocyanate and a polyether polyol, where: (i) the polymeric isocyanate contains five weight-percent or more methylene diphenyl diisocyanate; (ii) the polymeric isocyanate has a functionality of 3.0 or less; (iii) the polyether polyol is present in the pre-polymer at a concentration of one to 25 weight-percent; (iv) the polyol has an equivalent weight of 50 to 500 grams per equivalent; (v) the –NCO concentration of the pre-polymer is 15 to 31 weight-percent; (vi) the pre-polymer is free of isocyanate trimers; (b) a polyester polyol component containing 10 to 25 weight-percent of free glycol; and (c) a blowing agent that contains less than five weight-percent water; where the ratio of pre-polymer and polyester result in foam having a trimer content of 12 to 22 weight-percent, and an –NCO index of more than 300 and less than 700.

4 Claims, No Drawings

POLYURETHANE FOAM FROM HIGH FUNCTIONALITY POLYISOCYANATE

BACKGROUND OF THE INVENTION

Field of the Invention

The present invention relates to a two-component system for preparing polyurethane foam.

Introduction

Polyurethane foams prepared using poly(methylene diphenyl diisocyanate) (PMDI) having a functionality of 3.0 or less suffer from having low thermal insulation properties relative to foam prepared from PMDI having a functionality greater than 3.0. Nonetheless, it is desirable to prepare thermally insulating foam using PMDI having a functionality of 3.0 or less because lower functionality PMDI is less expensive to obtain than higher functionality PMDI.

U.S. Pat. No. 4,791,148 discloses a method for increasing the thermal insulating properties (decreasing the thermal conductivity properties) of polymeric foam by reacting a pre-polymer reaction product of a polyester polyol and isocyanate with a polyol.

U.S. Pat. No. 5,064,873 discloses a method for producing foam having increased thermal insulating properties by reacting a pre-polymer of an isocyanate and a polyol with a polyester polyol. The polyol used to prepare the pre-polymer must have a low free glycol content (less than about 7 weight percent based on total polyester polyol weight) in order to achieve the improved foam insulation value.

It would advance the art of thermally insulating polymeric foam to discover how to prepare thermally insulating foam using a PMDI with a functionality of 3.0 or less. At the same time it would further advance the art if the solution did not require a pre-polymer of a polyester polyol or a polyol having less than 7 weight-percent free glycol content based on polyol weight.

BRIEF SUMMARY OF THE INVENTION

The present invention provides a solution to the problem of discovering how to prepare a thermally insulating polymeric foam having a thermal conductivity value of less than 24.0, preferably 23.5 or less and even 23.0 or less milliWatts per meter*Kelvin (per ASTM C518) using a PMDI with a functionality of 3.0 or less while at the same time without requiring a pre-polymer of a polyester polyol or a polyol having less than 7 weight-percent free glycol content based on polyol weight. In fact, the present invention can be free of a pre-polymer of a polyester polyol and/or a polyol having less than 7 weight-percent free glycol content based on polyol weight.

Surprisingly, the solution has been found by preparing polymeric foam from a two-component polyurethane system where one part comprises a pre-polymer from a polymeric isocyanate and a polyether polyol and the other part comprises polyester polyol having a free glycol content of 10 weight-percent or more. Even more surprising is that the blowing agent contains less than five weight-percent water based on blowing agent weight.

In a first aspect, the present invention is a formulation system comprising: (a) a pre-polymer that is a reaction product of a polymeric isocyanate and a polyether polyol, where: (i) the polymeric isocyanate contains five weight-percent or more methylene diphenyl diisocyanate based on total polymeric isocyanate weight; (ii) the polymeric isocyanate has a functionality of 3.0 or less; (iii) the polyether polyol is present in the pre-polymer at a concentration of one weight-percent or more and 25 weight-percent or less based on total pre-polymer weight; (iv) the polyol has an equivalent weight of 50 or more and 500 or less grams per equivalent; (v) the –NCO concentration of the pre-polymer is 15 weight-percent or more and 31 weight-percent or less based on total pre-polymer weight as determined according to ASTM D2572; (vi) The pre-polymer is free of isocyanate trimers as determined by nuclear magnetic resonance spectroscopy; and (b) a polyester polyol component comprising 10 weight-percent or more and 25 weight-percent or less of free glycol based on total polyester polyol component weight and the balance being polyester polyol; and (c) a blowing agent that contains less than five weight-percent water based on total blowing agent weight; where the ratio of pre-polymer and polyester polyol are such that, when mixed together they result in foam having a trimer content of 12 weight-percent or more and 22 weight-percent or less based on total polymer weight in the foam, and an –NCO index of more than 300 and less than 700.

The formulation of the present invention is useful for preparing polyurethane foam. The method of the present invention is useful for preparing polymeric foam from the formulation of the present invention. The foam of the present invention is useful as a thermal insulating material.

DETAILED DESCRIPTION OF THE INVENTION

"And/or" means "and, or alternatively". Ranges include endpoints unless otherwise stated.

Test methods refer to the most recent test method as of the priority date of this document unless a date is indicated with the test method number as a hyphenated two digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standardization.

The formulation system of the present invention comprises (a) a pre-polymer and (b) a polyester polyol component.

The pre-polymer (a) is a reaction product of a polymeric isocyanate and a polyether polyol. The polymeric isocyanate contains five weight-percent (wt %) or more, preferably 20 wt % or more and at the same time desirably 95 wt % or less of methylene diphenyl diisocyanate base on total polymeric isocyanate weight. Determine wt % methylene diphenyl diisocyanate in the pre-polymer by high pressure liquid chromatography according to ASTM D7252-06 (2011) e1.

The polymeric isocyanate has an average functionality of 3.0 or less and is desirably 2.0 or more. Functionality is a measure of the average number of –NCO functionalities per molecule. Determine average number of –NCO functionalities per molecule according to ASTM D7252-06 (2011) e1.

Suitable polymeric isocyanates include aromatic and aliphatic (including cycloaliphatic) polyisocyanates. Examples of suitable polymeric isocyanates include polymeric methylene diphenyl diisocyanate (MDI) and polymeric hexamethylene diisocyanate.

The polyether polyol is desirably selected from a group consisting of primary hydroxyl containing polyols, secondary hydroxyl containing polyols and combinations thereof. Additionally, or alternatively, the polyether polyol desirably contains alkylene oxide units selected from a group consisting of ethylene oxide, propylene oxide and combinations thereof.

The polyether polyol has an equivalent weight of 50 grams per equivalent (g/eq) or more and can have an equivalent weight of 100 g/eq or more, 150 g/eq or more, 200 g/eq or more, 250 g/eq or more, 300 g/eq or more, 350 g/eq or more and even 400 g/eq or more while at the same time generally has an equivalent weight of 500 g/eq or less and can have an equivalent weight of 450 g/eq or less, 400 g/eq or less, 350 g/eq or less, 300 g/eq or less and even 250 g/eq or less. Determine equivalent weight by using formula I:

$$\text{Equivalent Weight} = 56.1 \times 1000 / (\text{OH Number}) \quad \text{(I)}$$

where OH number is determined according to ASTM D 4274-99. Notably, formula I neglects the acid weight of polyol, which is negligible and can be neglected for calculations.

The polyether polyol desirably has a hydroxyl number (or "OH number") of 110 milligrams potassium hydroxide per gram of polyol (mg KOH/g) or more, preferably 112 mg/KOH/g or more, and can be 120 mg KOH/g or more, 150 mg KOH/g or more, 175 mg KOH/g or more, 200 mg KOH/g or more, 500 mg KOH/g or more and even 750 mg KOH/g or more while at the same time is typically 1200 mg KOH/g or less, preferably 1150 mg KOH/g or less, more preferably 1122 mg KOH/g or less, and can be 1100 mg KOH/g or less, 100 mg KOH/g or less, 750 mg KOH or less, 500 mg KOH/g or less 250 mg KOH or less and even 200 mg/KOH or less. The hydroxyl number corresponds to the amount of potassium hydroxide in milligrams required to react with the acetic acid bonded to an acetylated gram of polyether polyol. Determine OH numbers according to ASTM D4274-99.

The polyether polyol used to prepare the pre-polymer desirably has an average functionality of two or more, and can have an average functionality of three or more, four or more, five or more, six or more, even seven or more while at the same time typically has an average functionality of eight or less, preferably seven or less and can have an average functionality of six or less, five or less, four or less even three or less. Average functionality of a polyether polyol refers to the average number of OH functionalities per molecule. Determine functionality of a polyol according to ASTM D4274-99.

Suitable polyether polyols include those selected from aliphatic an aromatic polyether polyols. Examples of suitable polyether polyols include any one or any combination of more than one of ethylene glycol, propylene glycol, butylene glycol, diethylene glycol, triethylene glycol, and polyalkylene glycols such as polyethylene glycol, polypropylene glycol, also (1,2)-propanediol, (1,3)-propanediol, (1,3)-butanediol, (1,4)-butanediol, and (1,6)-hexanediol and isomers.

The polyether polyol is present in the pre-polymer at a concentration of one wt % or more and can be present at a concentration of two wt % or more, three wt % or more, four wt % or more, five wt % or more, six wt % or more, seven wt % or more, eight wt % or more, nine wt % or more, 10 wt % or more, 12 wt % or more 14 wt % or more 16 wt % or more, 18 wt % or more and even 20 wt % or more while at the same time is generally present at a concentration of 25 wt % or less, and can be present at a concentration of 24 wt % or less, 23 wt % or less, 22 wt % or less 21 wt % or less 20 wt % or less, 18 wt % or less, 16 wt % or less and even 14 wt % or less where wt % relative to total pre-polymer weight. Determine wt % polyether polyol in the pre-polymer based on the wt % of polyether polyol used to make the pre-polymer relative to other pre-polymer reactants.

The pre-polymer has an –NCO concentration of 15 wt % or more, preferably 18 wt % or more, more preferably 20 wt % or more, even more preferably 22 wt % or more, and can be 24 wt % or more, 26 wt % or more, 28 wt % or more and at the same time is 31 wt % or less based on total pre-polymer weight. Surprisingly, it was discovered that when the pre-polymer has an –NCO concentration in these ranges, the thermal insulating ability of the resulting foam is particularly high. Determine –NCO concentration according to ASTM D2572.

The pre-polymer is free of isocyanate trimers as determined by carbon-13 nuclear magnetic resonance spectroscopy.

The polyester polyol component (b) comprises a polyester polyol. Desirably, the polyester polyol is selected from primary polyester polyols, secondary polyester polyols and combinations thereof. The polyester polyol can contain alkylene oxide units. Desirably, the alkylene oxide units are selected from a group consisting of ethylene oxide, propylene oxide and combinations thereof.

The polyester polyol desirably has an equivalent weight and hydroxyl number as described for the polyether polyol used to prepare the pre-polymer.

The polyester polyol desirably has an average functionality of two or more and at the same time of three or less. Determine average functionality of the polyester polyol as described for the polyether polyol of the pre-polymer.

Desirably, the polyester polyol has an aromaticity of 10 wt % or more and at the same time 20 wt % or less. Determine aromaticity of the polyester polyol as a weight percent of aromatic carbons and their attached hydrogens relative to total weight of the polyol as determined by proton nuclear magnetic resonance spectroscopy.

Desirably, the polyester polyol is a reaction product of terephthalic acid and glycerol.

The polyester polyol component also comprises free glycol at a concentration of 10 wt % or more and can comprise 12 wt % or more, 14 wt % or more, 16 wt % or more, 18 wt % or more, 20 wt % or more even 22 wt % or more and at the same time comprises 25 wt % or less and can comprise 24 wt % or less, 22 wt % or less, 20 wt % or less, 18 wt % or less, 18 wt % or less, 16 wt % or less and even 14 wt % or less based on total polyester polyol component weight. Determine the free glycol concentration according to proton nuclear magnetic resonance spectroscopy (method as described in Kadkin, O, J. Polym. Sci. A, 41, 1120 (2003)).

Mix the pre-polymer (a) and polyester polyol (b) together to form polyurethane foam. Mix the prep-polymer (a) and polyester polyol (b) together at a ratio such that they produce a foam having a trimer content of 12 wt % or more and 22 wt % or less based on total polymer weight in the foam and an –NCO index of more than 300 and less than 700.

A common thermoset polyurethane foam contains "trimer" linkages, which are a series of three linkages between isocyanate moieties that form a ring. A thermoset polyurethane foam comprising trimer linkages can be characterized by a "trimer content" (also called "percent trimer" or "% Trimer"), which is the weight-percent of trimer moieties to total polymer weight. Trimer content is calculated for a thermoset polyurethane foam from its starting materials by dividing the difference between the number of isocyanate equivalents and isocyanate reactive equivalents in the starting materials by the sum of the masses for the isocyanate starting materials and mass of isocyanate reactive starting materials, then multiplying that ratio by (42) and then multiplying that by 100.

–NCO index (or "isocyanate index") is a measure of the excess of isocyanate in the reaction mixture. Calculate –NCO index according to formula II:

$$\text{–NCO Index} = 100 \times (\text{–NCO equivalents}) / (\text{hydroxyl equivalents}) \quad \text{(II)}$$

where "—NCO equivalents" is the total number of reactive —NCO groups in all of the active isocyanate components in the reaction mixture and "hydroxyl equivalents" is the total number of all active hydroxyl groups in the reaction mixture. An "active" hydroxyl group is a hydroxyl group that reacts with an isocyanate group. Generally, all hydroxyls tend to be active except phenol hydroxyls.

The formulation system further comprises a blowing agent that is mixed in separately from pre-polymer (a) and polyester polyol (b) or that is included in one or both of the pre-polymer (a) and polyester polyol (b). The blowing agent can be any that are commonly used on two-component polyurethane foam systems, yet contains less than five weight-percent (wt %), preferably four wt % or less and can contain three wt % or less, two wt % or less or even one wt % or less of water based on total blowing agent weight. Desirably, the blowing agent is any one or any combination of more than one selected from a group consisting of water, pentane isomers, 2,2-dimethylbutane and hydrofluoro-olefins (HFOs, or "fluorinated alkenes"). Particularly desirable HFOs include trans-1-chloro-3,3,3-trifluoropropene (HFO-1233zd) and (z)-1,1,1,4,4,4-hexafluoro-2-butene (HFO-1336mzz).

The blowing agent is desirably present at a concentration sufficient to expand the formulation into polymeric foam having a density of 24 kilograms per cubic meter ($kg/m^3$) or more and 48 $kg/m^3$ or less as determined by ASTM D1622. Typically, this corresponds to a blowing agent concentration in a range of 0.6 to 1.2 moles of blowing agent per kilogram of formulation system weight.

Prepare polymeric foam from the formulation of the present invention by mixing the pre-polymer, polyester polyol and blowing agents together and allowing them to react. During the reaction, the blowing agent produces gas that expands the polymerizing polymer causing it to expand into polymeric foam.

The polymeric foam of the present invention is particularly valuable as a thermal insulating material. The polymeric foam has a thermal conductivity value of 24.0 milliWatts per meter*Kelvin (mW/m*K) of 24.0 or less, preferably 23.5 mW/m*K or less and even more preferably 23.0 mW/m*K or less.

EXAMPLES

Comparative Example A: Formulation System without Pre-Polymer

Prepare an "A" side of a formulation system, the A-side consisting of polymeric methylene diphenyl diisocyanate (PMDI) having an average molecular weight of approximately 340 grams per mole, a functionality of approximately 2.7, an isocyanate equivalent weight of approximately 134 g/eq, and —NCO content of approximately 31.4 wt %, viscosity of 150-220 centipoise at 25 degrees Celsius (for example, PAPI™ 27 PMDI; PAPI is a trademark of The Dow Chemical Company).

Prepare a "B" side of a formulation system by mixing together the components identified in Table 1 at the concentrations indicated in Table 1. Concentrations are provided in weight-parts.

TABLE 1

| Component | Description | Concentration |
|---|---|---|
| Polyol 1 | Polyester polyol produced from purified terephthalic acid (37 wt %), glycerin (8 wt %), diethylene glycol (17 wt %), and 200 MW polyethylene glycol (38 wt %), hydroxyl number = 315, and 16.5 wt % total free glycol as determined by proton nuclear magnetic resonance spectroscopy. | 100 |
| Surfactant 1 | Polyethylene oxide-butylene oxide-polyethylene oxide triblock polymer with 62.3 wt % ethylene oxide units, an equivalent weight of 3400 g/eq and nominal viscosity of 3300 centipoise at 25 degrees Celsius (° C.). For example, VORASURF ™ 504 (VORASURF is a trademark of The Dow Chemical Company). | 4 |
| Flame Retardant 1 | Bromine based reactive diol containing 43 wt % bromine, specific gravity of 1.75 and hydroxyl number of 160-188. For example SAYTEX ™ RB-9170 (SAYTEX is a trademark of Albemarle Corporation). | 28 |
| Flame Retardant 2 | Triethylphosphate | 26.5 |
| Blowing Agent | Deionized water | 2 |
| Blowing Agent | Cyclopentane | 24.6 |
| Blowing Agent | Isopentane | 8.2 |
| Blowing Agent | Dimethylbutane | 8.2 |

Mix 535 weight-parts of the A-side to 201.5 weight parts of the B-side formulation using a high speed pneumatic mixer at 5000 revolutions per minute for ten seconds in a plastic container. Add to the center of the mixture in the plastic container 14.5 weight-parts of a catalyst. The catalyst consists of 27.1 wt % polyethylene glycol (200 gram per mole molecular weight), 3.9 wt % 2-hydroxypropyl trimethyl ammonium formate, 34.5 wt % potassium 2-ethylhexanoate and 34.5 wt % potassium acetate (for example, Pel-Cat 9887F available from Ele Corporation). Mix the formulation for 10 seconds and pour into a cardboard box. Allow to set for 24 hours during which time it foams and sets. The foaming and resulting foam have the characteristics set forth in Table 2.

TABLE 2

| Characteristic | Value |
|---|---|
| Cream time* | 15 seconds |
| Gel time** | 32 seconds |
| Density (ASTM D1622) | 31.7 kilograms per cubic meter ($kg/m^3$) |
| Thermal Conductivity (ASTMC518) | 24.1 milliWatts per meter * Kelvin (mW/m * K) |

*Cream time is the time between when the components are mixed and when bubbles first appear as determined by ASTM D7487.
**Gel time is the time at which stings of tacky material can be pulled away from the surface of the foam when the surface is touched by the edge of a tongue depressor or similar implement.

Comparative Example A reveals that the foam formulation that does not include a pre-polymer of PMDI achieves a thermal conductivity value of greater than 24 milliWatts per meter*Kelvin (mW/m*K).

Examples 1-4: Use of Pre-Polymer

Pre-Polymer Synthesis. Prepare four different PMDI pre-polymers using the following procedure and the formulations in Table 3 to achieve pre-polymers with properties also described in Table 3.

TABLE 3

| Pre-Polymer | Polyol | PMDI | Mass of Polyol (g) | Mass of PMDI (g) | Wt % NCO | Wt % monomeric MDI |
|---|---|---|---|---|---|---|
| PP1 | Polyol 1 | (that of Comp Ex A) | 80.7 | 2919.3 | 29.7 | 38.4 |
| PP2 | Polyol 2 | (that of Comp Ex A) | 84.6 | 2915.4 | 30.1 | 42.7 |
| PP3 | Polyol 3 | (that of Comp Ex A) | 76.2 | 2923.8 | 29.8 | 41.1 |
| PP4 | Polyol 4 | (that of Comp Ex A) | 55 | 2945 | 29.8 | 37.1 |

Table 4 provides a description of the various polyols for preparing the pre-polymers. "F" refers to functionality. Equivalent weight ("EW") is in grams per equivalent.

TABLE 4

| Polyol | Description | F | EW |
|---|---|---|---|
| Polyol 1 | Polyester polyol produced from purified terephthalic acid (37 wt %), glycerin (8 wt %), diethylene glycol (17 wt %), and 200 MW polyethylene glycol (38 wt %). The polyester polyol has a hydroxyl number = 315, and 16.5 wt % total free glycol as determined by proton nuclear magnetic resonance spectroscopy | 2.4 | 178 |
| Polyol 2 | A 7 functional sucrose/glycerine initiated polyol, equivalent weight about 200 g/eq, OH number of 280 mg, KOH/gm, and a number average molecular weight of 1402 gm/mol. The polyol is chain extended using ethylene oxide and propylene oxide (EO-PO polyol) and has an average of approximately 25.6 wt % ethylene oxide units based on molecular weight. For example VORANOL ™ 280 polyol (VORANOL is a trademark of The Dow Chemical Company). | 7 | 200 |
| Polyol 3 | A 4.5 functional sucrose/glycerine initiated polyol, equivalent weight about 155 g/eq, OH number of 360 mg KOH/gm, and a number average molecular weight of about 697 gm/mol. The polyol is chain extended using propylene oxide (PO polyol). For example VORANOL 360 polyol from The Dow Chemical Company. | 4.5 | 155 |
| Polyol 4 | A trifunctional glycerine initiated polyol, equivalent weight about 85 g/eq, OH number of 660 mg KOH/gm, and a number average molecular weight of about 250 gm/mol. The polyol is chain extended using propylene oxide (PO polyol). For Example, VORANOL 225 polyol from The Dow Chemical Company. | 3 | 85 |

Prepare the pre-polymer in a glass three-necked flask under dry nitrogen blanket. Into the flask add the PMDI to the flask. Heat to 80 degrees Celsius (° C.). While stirring, slowly add the polyol and allow the reaction to run for four hours. Characterize the reaction products for percent –NCO using titration and viscosity.

Foam Preparation. Prepare polymeric foam in like manner as Comparative Example A except using the formulations identified below for each of the following examples. Foam and foaming characteristics for each of the Example foams is also provided below Example 1. A-side is 443.7 weight-parts of pre-polymer PP2. B-side is a mixture of 70.42 weight-parts of Polyol 1, 2.82 weight parts of Surfactant 1, 19.75 weight-parts of Flame Retardant 1, 18.84 weight-parts Flame Retardant 2, 1.62 weight-parts water and 35.78 weight-parts of a blowing agent consisting of 20 wt % isopentane, 3 wt % n-pentane, 19 wt % 2,2-dimethylbutane and 58 wt % cyclopentane. For the catalyst use 15.65 weight-parts of a catalyst composition consisting of 2.43 wt % triethylene diamine, 26.82 wt % of polyethylene glycol (200 g/mol molecular weight), 2.57 wt % of 2-hydroxypropyl trimethyl ammonium formate, 34.09 wt % potassium 2-ethyl hexanoate and 34.09 wt % of potassium acetate. ("Catalyst 1", for example Pel-Cat 9887E). Resulting foaming and foam characteristics are in Table 5.

Example 2. A-side is 440.1 weight-parts of pre-polymer made with Polyol 3. B-side is a mixture of 70.42 weight-parts Polyol 1, 2.82 weight parts of Surfactant 1, 19.72 weight-parts of Flame Retardant 1, 18.66 weight-parts Flame Retardant 2, 1.57 weight-parts water and 36.24 weight-parts of a blowing agent consisting of 20 wt % isopentane, 3 wt % n-pentane, 19 wt % 2,2-dimethylbutane and 58 wt % cyclopentane. For the catalyst use 15.65 weight-parts of Catalyst 1. Resulting foaming and foam characteristics are in Table 5.

Example 3. A-side is 441.18 weight-parts of pre-polymer made with Polyol 4. B-side is a mixture of 71.77 weight-parts Dow IP9005 polyol, 2.87 weight parts of Surfactant 1, 20.09 weight-parts of Flame Retardant 1, 19.02 weight-parts Flame Retardant 2, 1.44 weight-parts water and 32.96 weight-parts of a blowing agent consisting of 20 wt % isopentane, 3 wt % n-pentane, 19 wt % 2,2-dimethylbutane and 58 wt % cyclopentane. For the catalyst use 17.11 weight-parts of Catalyst 1. Resulting foaming and foam characteristics are in Table 5.

Example 4. A-side is 430.81 weight-parts of pre-polymer made with Polyol 1. B-side is a mixture of 77.04 weight-parts Polyol 1, 3.08 weight parts of Surfactant 1, 21.57 weight-parts of Flame Retardant 1, 20.41 weight-parts Flame Retardant 2, 1.54 weight-parts water and 34.29 weight-parts of a blowing agent consisting of 20 wt % isopentane, 3 wt % n-pentane, 19 wt % 2,2-dimethylbutane and 58 wt % cyclopentane. For the catalyst use 14.17 weight-parts of Catalyst 1. Resulting foaming and foam characteristics are in Table 5.

TABLE 5

| Characteristic | Example 1 | Example 2 | Example 3 | Example 4 |
| --- | --- | --- | --- | --- |
| Cream time | 15 seconds | 16 seconds | 14 seconds | 14 seconds |
| Gel time | 33 seconds | 34 seconds | 31 seconds | 31 seconds |
| Density (ASTM D1622) | 31 kg/m$^3$ | 31.5 kg/m$^3$ | 31 kg/m$^3$ | 30.8 kg/m$^3$ |
| Polyester polyol (wt % of formulation) | 11.6 | 11.6 | 11.8 | 12.8 |
| NCO Index | 404 | 386 | 394 | 385 |
| Trimer (wt % of formulation) | 18.4 | 18.8 | 18.7 | 18.1 |
| Thermal Conductivity (ASTMC518) | 22.7 mW/m * K | 22.6 mW/m * K | 23.0 mW/m * K | 23.0 mW/m * K |

The data in Table 5 reveals that foam prepared using the pre-polymer achieves thermal conductivity values below 24.0 mW/m*K, even 23.5 mW/m*K or less, and even 23.0 mW/m*K or less. In contrast, Table 2 reveals that similar foam made without use of pre-polymer only achieves thermal conductivity values of greater than 24.0 mW/m*K.

What is claimed is:

1. A polyisocyanurate foam comprising the reaction product of a formulation system comprising:
   (a) a pre-polymer that is a reaction product of a polymeric isocyanate and a polyether polyol, where:
      (i) the polymeric isocyanate contains five weight-percent or more methylene diphenyl diisocyanate based on total polymeric isocyanate weight;
      (ii) the polymeric isocyanate has a functionality of 3.0 or less;
      (iii) the polyether polyol is present in the pre-polymer at a concentration of one weight-percent or more and 25 weight-percent or less based on total pre-polymer weight;
      (iv) the polyether polyol has an equivalent weight of 50 or more and 500 or less grams per equivalent;
      (v) the NCO concentration of the pre-polymer is 15 weight-percent or more and 31 weight-percent or less based on total pre-polymer weight as determined according to ASTM D2572;
      (vi) The pre-polymer is free of isocyanate trimers as determined by nuclear magnetic resonance spectroscopy; and
   (b) a polyester polyol component comprising 10 weight-percent or more and 25 weight-percent or less of free glycol based on total polyester polyol component weight and the balance being polyester polyol; and
   (c) a blowing agent that contains less than five weight-percent water based on total blowing agent weight;
   where the ratio of pre-polymer and polyester polyol are such that, when mixed together they result in foam having a trimer content of 12 weight-percent or more and 22 weight-percent or less based on total polymer weight in the foam, and an NCO index of more than 300 and less than 700; and wherein the polyisocyanurate foam has a density of 24 kilograms per cubic meter or more and 48 kilograms per cubic meter or less as determined by ASTM 1622.

2. The polyisocyanurate foam of claim 1, where the blowing agent in the formulation system is selected from a group consisting of water, pentane isomers, 2,2-dimethylbutane and hydrofluoro-olefins.

3. The polyisocyanurate foam of claim 1, where the polyester polyol in the formulation system is a reaction product of terephthalic acid and glycerol.

4. The polyisocyanurate foam of claim 1 having a thermal conductivity value of less than 24.0 milliWatts per meter*Kelvin as determined by ASTM C518.

* * * * *